(12) United States Patent
Horigome et al.

(10) Patent No.: US 8,025,954 B2
(45) Date of Patent: Sep. 27, 2011

(54) SANDWICH PANEL

(75) Inventors: Hiroshi Horigome, Mitaka (JP);
Masaaki Hirai, Joetsu (JP); Hiroshi Tanaka, Joetsu (JP)

(73) Assignees: Jamco Corporation, Tokyo (JP);
Arisawa Mfg. Co., Ltd., Niigata (JP)

( * ) Notice: Subject to any disclaimer, the term of this patent is extended or adjusted under 35 U.S.C. 154(b) by 595 days.

(21) Appl. No.: 11/634,168

(22) Filed: Dec. 6, 2006

(65) Prior Publication Data
US 2008/0131645 A1 Jun. 5, 2008

(30) Foreign Application Priority Data
Nov. 30, 2006 (JP) .................. 2006-323882

(51) Int. Cl.
*B32B 5/02* (2006.01)
*B32B 7/00* (2006.01)

(52) U.S. Cl. ............. 428/212; 428/116; 428/293.7; 428/297.1; 428/297.4; 428/421; 428/73

(58) Field of Classification Search .......... None
See application file for complete search history.

(56) References Cited

U.S. PATENT DOCUMENTS

| | | | | |
|---|---|---|---|---|
| 3,502,171 A | * | 3/1970 | Cowan ............ | 181/292 |
| 4,368,234 A | * | 1/1983 | Palmer et al. ......... | 442/186 |
| 4,526,421 A | * | 7/1985 | Brennan et al. ........ | 297/232 |
| 4,680,216 A | | 7/1987 | Jacaruso | |
| 5,043,214 A | * | 8/1991 | Das et al. ............. | 428/359 |
| 5,106,668 A | * | 4/1992 | Turner et al. .......... | 428/116 |
| 5,328,744 A | * | 7/1994 | Kaufmann et al. ...... | 428/116 |
| 5,604,010 A | | 2/1997 | Hartz et al. | |
| 5,667,866 A | * | 9/1997 | Reese, Jr. ............ | 428/116 |
| 6,099,680 A | | 8/2000 | Harris et al. | |

(Continued)

FOREIGN PATENT DOCUMENTS

EP  0579000 A1  1/1994

(Continued)

OTHER PUBLICATIONS

Compsites. ASM Handbook, vol. 21, Composites. Daniel B. Miracle, ASM International, 2001.*

(Continued)

*Primary Examiner* — David Sample
*Assistant Examiner* — Prashant J Khatri
(74) *Attorney, Agent, or Firm* — Sughrue Mion, PLLC

(57) ABSTRACT

A sandwich panel that has excellent practicality as an inner wall material used in aircraft, for example, whereby the abovementioned requirements of flexural strength, peel strength, and in-plane shear strength can be satisfied while having reduced weight. A sandwich panel in which a middle material 2 and a surface material 3 that are each formed by laminating a plurality of fiber bodies are laminated from inside to outside on the upper and lower surfaces of a hollow columnar core 1, wherein the middle material 2 is composed of a set of unidirectional fiber bodies 4, 5 whose fibers are aligned in one direction, fibers in a first unidirectional fiber body 4 are in a direction that is substantially parallel to an edge of the sandwich panel, fibers in a second unidirectional fiber body 5 are in a direction that is substantially orthogonal to an edge of the sandwich panel, and bonding layers 6, 7 having a resin content ratio of 50% or higher are provided between the unidirectional fiber bodies 4, 5 and between the hollow columnar core 1 and an inside unidirectional fiber body 5.

10 Claims, 5 Drawing Sheets

| | | COMPARATIVE EXAMPLE | WORKING EXAMPLE 1 | WORKING EXAMPLE 2 |
|---|---|---|---|---|
| WEIGHT (kg/m$^2$) | | 1.38 | 1.51 | 1.79 |
| PEEL STRENGTH (N · in/3in) | | 51 | 80~100 | 80~100 |
| BENDING LOAD (N) | | 453 | 520 | 630 |
| IPS (kN) | | 14 | 20 | 33 |
| FLAME RETARDANT PROPERTIES /HRR | FIVE-MINUTE PEAK HEAT RELEASE RATE (kW/m$^2$) | 40 | 25 | 23 |
| | TWO-MINUTE HEAT RELEASE INTEGRAL (kW · min/m$^2$) | 36 | 25 | 23 |
| SMOKE DENSITY | | — | 9 | 11 |

U.S. PATENT DOCUMENTS

| | | | |
|---|---|---|---|
| 6,179,086 B1 * | 1/2001 | Bansemir et al. | 181/292 |
| 6,508,910 B2 * | 1/2003 | Zhou et al. | 156/307.3 |
| 6,511,730 B1 * | 1/2003 | Blair et al. | 428/73 |
| 6,663,737 B2 * | 12/2003 | Hsiao et al. | 156/160 |
| 6,893,712 B2 * | 5/2005 | Aoyagi et al. | 428/297.4 |
| 2002/0179271 A1 * | 12/2002 | Lindenfelser | 162/281 |
| 2006/0035548 A1 * | 2/2006 | Goto et al. | 442/65 |
| 2006/0121805 A1 * | 6/2006 | Krulic | 442/20 |

FOREIGN PATENT DOCUMENTS

| | | | |
|---|---|---|---|
| EP | 672776 A1 * | 9/1995 | |
| JP | 6124439 A | 2/1986 | |
| JP | 62044444 A | 2/1987 | |
| JP | 63084932 A * | 4/1988 | |
| JP | 04276435 A | 10/1992 | |
| JP | 05138742 A | 6/1993 | |
| JP | 06-017530 | 1/1994 | |
| JP | 06047850 A | 2/1994 | |
| JP | 07125118 A | 5/1995 | |
| JP | 07180281 A | 7/1995 | |
| JP | 08258189 A | 10/1996 | |
| JP | 2001049013 A | 2/2001 | |
| JP | 2002011812 A | 1/2002 | |
| JP | 2005313613 A | 11/2005 | |
| JP | 2005324355 A * | 11/2005 | |
| JP | 2008511478 A | 4/2008 | |
| WO | 9217331 A1 | 10/1992 | |

OTHER PUBLICATIONS

Bitzer, T. "Honeycomb Technology: Materials, design, manufacturing, applications, and testing". Chapman & Hall, 1st Edition, (1997); p. 89.*

Pillai, K.M. "Governing equations for unsaturated flow through woven fiber mats. Part 1. Isothermal Flows". Composites: Part A 33. (2002), pp. 1007-1019.*

Pillai et al. "Governing equations for unsaturated flow through woven fiber mats. Part 2. Non-isothermal flows". Composites: Part A 35. (2004), pp. 403-415.*

Database WPI Week 199246; Thomson Scientific, London, GB; AN 1992-376822, XP-002573234 & JP 4276435 A (Nippon Steel Chem Co) Oct. 1, 1992.

Database WPI Week 198714; Thomson Scientific, London, GB; AN 1987-097066, XP002573233 & JP 62044444 A (Asahi Composite KK) Feb. 26, 1987.

European Search Report dated Sep. 28, 2010.

* cited by examiner

FIG.3

| | COMPARATIVE EXAMPLE | WORKING EXAMPLE 1 | WORKING EXAMPLE 2 |
|---|---|---|---|
| WEIGHT (kg/m$^2$) | 1.38 | 1.51 | 1.79 |
| PEEL STRENGTH (N·in/3in) | 51 | 80~100 | 80~100 |
| BENDING LOAD (N) | 453 | 520 | 630 |
| IPS (kN) | 14 | 20 | 33 |
| FLAME RETARDANT PROPERTIES /HRR — FIVE-MINUTE PEAK HEAT RELEASE RATE (kW/m$^2$) | 40 | 25 | 23 |
| FLAME RETARDANT PROPERTIES /HRR — TWO-MINUTE HEAT RELEASE INTEGRAL (kW·min/m$^2$) | 36 | 25 | 23 |
| SMOKE DENSITY | — | 9 | 11 |

SANDWICH PANEL

BACKGROUND OF THE INVENTION

1. Field of the Invention

The present invention relates to a sandwich panel.

2. Description of the Related Art

The type of honeycomb sandwich panel disclosed in Examined Utility Model Application Publication No. 6-17530 is used conventionally. In this honeycomb sandwich panel, plastic bodies that are reinforced with carbon (C) fiber and used as middle layers are laminated on both the upper and lower surfaces (both open end surfaces) of a honeycomb core that is made of hollow columnar cells aggregated in a plane, and surface members are then laminated on the plastic bodies reinforced with carbon (C) fiber.

SUMMARY OF THE INVENTION

Since light weight is linked to enhanced fuel economy in aircraft, for example, there has recently been a need for reduced weight of structural materials and interior materials. The type of honeycomb sandwich panel described above in which fiber-reinforced plastic panels are placed on the top and bottom of a honeycomb core is used as a material that enables this weight reduction.

In particular, the inner wall material that is one of the interior materials used in an aircraft must be lightweight, and the flexural strength, in-plane shear strength, and peel strength between the honeycomb core and the upper and lower fiber-reinforced plastic layers must also be adequate for a sandwich panel. However, these characteristics cannot be made adequate merely by varying the amount of fibers or varying the number of fiber layers that constitute the middle layer.

The present invention was developed as a result of concentrated investigation in view of the foregoing drawbacks, and an object of the present invention is to provide a sandwich panel that has excellent practicality as an inner wall material used in aircraft, for example, whereby the abovementioned requirements of flexural strength, peel strength, and in-plane shear strength can be satisfied while having reduced weight by improving the adhesion between layers of middle material that are formed by laminating a plurality of fiber bodies.

A summary of the present invention will be given with reference to the accompanying drawings.

In a sandwich panel according to a first aspect of the present invention, a middle material 2 and a surface material 3 that are each formed by laminating a plurality of fiber bodies are laminated from inside to outside on the upper and lower surfaces of a hollow columnar core 1, wherein the middle material 2 is composed of a set of unidirectional fiber bodies 4, 5 whose fibers are aligned in one direction, fibers in a first unidirectional fiber body 4 are in a direction that is substantially parallel to an edge of the sandwich panel, fibers in a second unidirectional fiber body 5 are in a direction that is substantially orthogonal to an edge of the sandwich panel, and bonding layers 6, 7 having a resin content ratio of 50% or higher are provided between the unidirectional fiber bodies 4, 5 and between the hollow columnar core 1 and an inside unidirectional fiber body 5.

In a sandwich panel according to a second aspect of the present invention, a middle material 2 and a surface material 3 that are each formed by laminating a plurality of fiber bodies are laminated from inside to outside on the upper and lower surfaces of a hollow columnar core 1, wherein the middle material 2 is composed of a set of unidirectional fiber bodies 4, 5 whose fibers are aligned in one direction, fibers in a first unidirectional fiber body 4 are in a direction that is substantially parallel to an edge of the sandwich panel, fibers in a second unidirectional fiber body 5 are in a direction that is substantially orthogonal to an edge of the sandwich panel, the unidirectional fiber bodies 4, 5 have a resin content ratio of 30% or lower, a bonding layer 6 having a resin content ratio of 50% or higher is provided between the unidirectional fiber bodies 4, 5, and a bonding layer 7 having a resin content ratio of 70% or higher is provided between the hollow columnar core 1 and an inside unidirectional fiber body 5.

The sandwich panel according to a third aspect of the present invention is the sandwich panel according to any one of the first and second aspects, wherein the bonding layers 6, 7 comprise woven fiber bodies 6, 7 in which fibers are used for a warp yarn and a woof yarn, and the yarns are woven, and the woven fiber bodies 6, 7 are formed so that the warp yarn and the woof yarn are each tilted approximately 45° in relation to the edge of the sandwich panel.

The sandwich panel according to a fourth aspect of the present invention is the sandwich panel according to the third aspect, wherein carbon fibers are used for the fibers of the unidirectional fiber bodies 4, 5, and glass fibers are used for the fibers of the woven fiber bodies 6, 7.

The sandwich panel according to a fifth aspect of the present invention is the sandwich panel according to the third aspect, wherein carbon fibers are used for the fibers of the unidirectional fiber bodies 4, 5, and glass fibers and carbon fibers are used for the fibers of the woven fiber bodies 6, 7.

The sandwich panel according to a sixth aspect of the present invention is the sandwich panel according to any one of the first through fifth aspects, wherein a polyvinylidene fluoride film or a non-woven cloth that includes glass fibers is employed as the surface material 3.

The sandwich panel according to a seventh aspect of the present invention is the sandwich panel according to any one of the first through sixth aspects, wherein the sandwich panel has a weight per unit area of 1.79 kg/m$^2$ or less, a maximum bending load of 520 N or greater, a peel strength of 80 N·in/3 in or greater, and an in-plane shear strength of 20 kN or greater.

The present invention structured as described above provides a sandwich panel that has excellent practicality as an inner wall material used in aircraft, for example, whereby the above-mentioned flexural strength, peel strength, and in-plane shear strength can be obtained while having reduced weight.

BRIEF DESCRIPTION OF THE DRAWINGS

FIG. 3 is a table showing the experimental results of the present working example;

DESCRIPTION OF THE PREFERRED EMBODIMENTS

Figure 1:
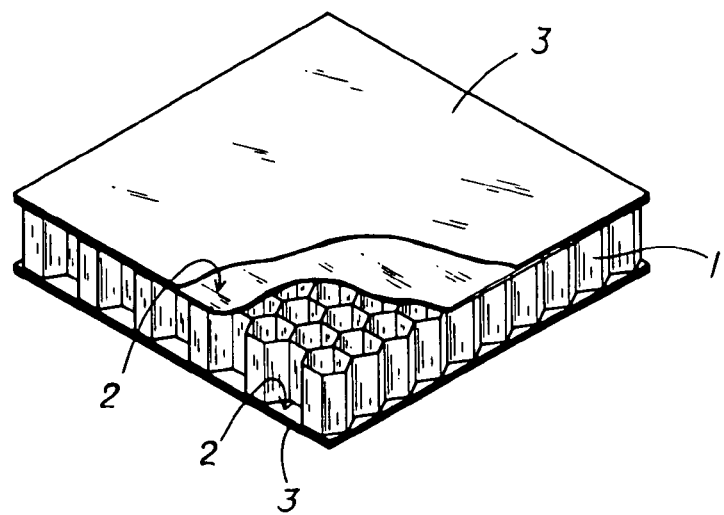
FIG. 1 is a schematic perspective view in which a portion of the present working example is removed.

Preferred embodiments of the present invention will be briefly described based on the drawings that show the operation of the present invention.

Satisfactorily bonding the unidirectional fiber bodies 4, 5 to each other and the hollow columnar core 1 to the inside unidirectional fiber body 5 through the use of bonding layers 6, 7 that have a resin content ratio of 50% or higher makes it possible to enhance adhesion between the layers, to enhance flexural strength, and to enhance peel strength between the upper and lower middle materials 2 and the hollow columnar core 1 while satisfying light weight even when the resin content ratio of the unidirectional fiber body 4, for example, is reduced by a certain amount (e.g., to 30% or lower).

The unidirectional fiber body 5 and the hollow columnar core 1, which are composed of different types of material, can be satisfactorily bonded to each other with minimal increase in weight, particularly when a bonding layer 6 having a resin content ratio of 50% or higher is provided between the unidirectional fiber bodies 4, 5, and a bonding layer 7 having a resin content ratio of 70% or higher is provided between the hollow columnar core 1 and the inside unidirectional fiber body 5.

Furthermore, when the bonding layers 6, 7 are composed of woven fiber bodies 6, 7 in which the warp and woof yarns are each tilted approximately 45° in relation to an edge of the sandwich panel, for example, pseudo-isotropy can be created by the unidirectional fiber body 4 that is parallel to the edge of the sandwich panel, the unidirectional fiber body 5 that is orthogonal to the edge, and the woven fiber bodies 6, 7 whose warp and woof yarns are tilted ±45° in relation to the edge, and the in-plane shear strength can be enhanced.

WORKING EXAMPLE

A specific working example of the present invention will be described based on the drawings.

As shown in FIG. 1, the present working example is a sandwich panel which is square in plan view and in which a middle material 2 and a surface material 3 that are each formed by laminating a plurality of fiber bodies are laminated from inside to outside on the upper and lower surfaces of a hollow columnar core 1, wherein the middle material 2 is composed of a set of unidirectional fiber bodies 4, 5 that are aligned in one direction, the fibers in a first unidirectional fiber body 4 are in a direction that is substantially parallel to an edge of the sandwich panel, the fibers in a second unidirectional fiber body 5 are in a direction that is substantially orthogonal to an edge of the sandwich panel, the resin content ratio of the unidirectional fiber bodies 4, 5 is set to 30% or lower, a bonding layer 6 having a resin content ratio of 50% or higher is provided between the unidirectional fiber bodies 4, 5, a bonding layer 7 having a resin content ratio of 70% or higher is provided between the hollow columnar core 1 and an inside unidirectional fiber body 5, and a polyvinylidene fluoride decorative film is employed as the surface material 3.

Each component will be specifically described.

A paper made of organic fibers (aramid fibers or cellulose fibers, for example) and impregnated with an incombustible resin, or an aggregate of numerous hexagonal aluminum cells in a plane (honeycomb core 1), is used as the hollow columnar core 1. The hollow columnar core 1 used in the present working example in particular has a density of 3 lb/ft$^3$ (pounds per cubic foot), a thickness of 10.5 mm, and a weight per unit area of 0.51 kg/m$^2$. The size of the hexagons is set so that the length of two opposing edges is ⅛ inch. The length of two opposing edges in the hexagons is not limited to ⅛ inch. The cell shape is also not limited to being hexagonal, and a square shape or any other hollow columnar shape may be used. A foam material having numerous holes inside, or another spongy porous material, may also be used.

A middle material 2 and a surface material 3 are laminated on the upper and lower surfaces (both open end surfaces) of the honeycomb core 1.

Figure 2:
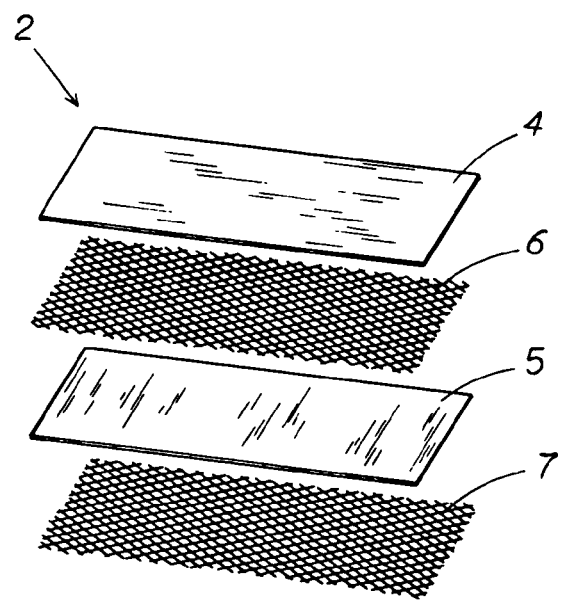
FIG. 2 is an enlarged schematic exploded perspective view showing the relevant portions of the present working example.

Specifically, as shown in FIG. 2, the middle material 2 is formed by the alternate lamination of a total of four layers comprising the unidirectional fiber bodies 4, 5 and the woven fiber bodies 6, 7 as bonding layers 6, 7. In the bonding layers, fibers are woven as a warp yarn and a woof yarn that is orthogonal to the warp yarn. In the present working example, the layers are laminated in sequence so that the outermost layer is the unidirectional fiber body 4 and the innermost layer is the woven fiber body 7.

Accordingly, even when the resin content ratio in the unidirectional fiber bodies 4, 5 is set to 30% or lower, since the woven fiber bodies 6, 7 as bonding layers 6, 7 are provided between the unidirectional fiber bodies 4, 5 and between the honeycomb core 1 and the inside unidirectional fiber body 5, it is possible to place a resin layer only in the position where adhesive strength is required from the woven fiber bodies 6, 7, and the weight of the unidirectional fiber bodies 4, 5 can be reduced.

In order to obtain the same level of adhesive strength as in the present working example without providing the bonding layers 6, 7, for example, a resin content ratio of 42% or higher would be required in the unidirectional fiber bodies, and adequate weight-reducing effects would be impossible to obtain (the resin content ratio generally required in a unidirectional fiber body (single layer) is about 30%).

Carbon fibers are also employed as the fibers of the unidirectional fiber bodies 4, 5. The fibers used in the unidirectional fiber bodies 4, 5 are not limited to carbon fibers, and aramid fibers, for example, having a density of 2 g/cm$^3$ or less to reduce weight may also be used.

The fibers in the unidirectional fiber body 4 positioned on the outside are arranged in the direction (0°) that is substantially parallel to the longitudinal edge of the sandwich panel that is substantially rectangular in plan view. The fibers in the other unidirectional fiber body 5 are arranged in the direction (90°) that is substantially perpendicular to the longitudinal edge of the sandwich panel. The fiber direction of the unidirectional fiber body 4 may also be set to 90°, and the fiber direction of the unidirectional fiber body 5 may be set to 0°.

Glass fibers are employed as the fibers of the woven fiber bodies 6, 7. Blended woven fiber bodies composed of glass fibers and carbon fibers may also be used as the woven fiber bodies 6, 7.

Specifically, woven fiber bodies (which have a weaving direction of ±45°) that are woven so that the warp yarn and the woof yarn are each angled approximately 45° in relation to the edge (longitudinal direction) of the sandwich panel are used as the woven fiber body 7 and the other woven fiber body 6 that are positioned on the inside and are bonded to the honeycomb core 1. Woven fiber bodies in which the warp and woof yarns intersect at 0° and 90° in the usual manner may be used as the woven fiber bodies 6, 7 and laminated so that the warp yarn and the woof yarn are each tilted approximately 45° in relation to the edge of the sandwich panel.

Accordingly, pseudo-isotropy is exhibited overall in the middle material 2 by the set of unidirectional fiber bodies 4, 5 whose fibers are directed at 0° and 90°, and the woven fiber bodies 6, 7 whose fibers are directed at +45° between the fiber directions of the unidirectional fiber bodies 4, 5. Because the fibers are arranged at ±45° in the woven fiber bodies 6, 7 in particular, the arrangement of the fibers in the tension direction (vertical direction of the in-plane shear test described hereinafter) and compression direction (horizontal direction of the in-plane shear test described hereinafter) of in-plane shear enhances the in-plane shear strength.

In the manufacturing process of the present working example, the fiber bodies 4, 5, 6, 7 are each impregnated with a heat-curable resin composition and heat-dried for 5 to 20 minutes at 80 to 100° C. to form prepregs, and the prepregs are laminated with the honeycomb core 1 in the abovementioned sequence and cured by heat-pressing at a pressure of 0.2 to 0.4 MPa and a temperature of 140 to 160° C. for 1 to 2 hours.

The resin used in the prepregs is a resol-based phenol resin selected with consideration for non-combustibility as an inner wall material for an aircraft interior. The specific resol-based phenol resin used has a five-minute peak heat release rate (HRR) of 30 kW/m² or less in a heat release test, a two-minute heat release integral of 30 kW·min/m² or less, and a smoke density of 200 or less during combustion. The abovementioned values were obtained when the HRR and smoke density were measured in accordance with the FAR25.853 specification required for aircraft interiors.

Adhesive strength increases as the resin content ratio of the woven fiber bodies is increased, but the weight of the fiber bodies as an aircraft material increases when the resin content ratio is increased. Therefore, the inventors discovered that weight can be reduced while maintaining adhesion between the unidirectional fiber body 5 and the honeycomb core 1 that are composed of different types of materials. This can be achieved by setting the fiber content of the woven fiber body 7 furthest inside to 20 to 40 g/m², and the resin content (resin content ratio) thereof to 70 to 85 wt %, and by setting the fiber content of the other woven fiber body to 35 to 55 g/m², and the resin content thereof to 50 to 65 wt %. In the present working example, the resin content ratio of the unidirectional fiber bodies 4, 5 is set to 29%, the resin content ratio of the woven fiber body 6 is set to 55%, and the resin content ratio of the woven fiber body 7 is set to 75%. The fiber content of the unidirectional fiber bodies 4, 5 is set to 130 to 150 g/m².

Specifically, the adhesive strength between the honeycomb core 1 and the unidirectional fiber body 5 is reduced by setting the resin content ratio of the unidirectional fiber bodies 4, 5 to 30% or less in the present working example, but the adhesive strength between the honeycomb core and the inside unidirectional fiber body 5 is enhanced by inserting a prepreg (woven fiber body 7) having a high resin content ratio in between the honeycomb core 1 and the inside unidirectional fiber body 5 to form a bonding layer between the honeycomb core 1 and the inside unidirectional fiber body 5. The flexural strength of the honeycomb sandwich panel, the peel strength between the honeycomb core 1 and the upper and lower middle layers 2, and the in-plane shear strength are also enhanced.

In order to obtain an adhesive strength, flexural strength, peel strength, and in-plane shear equivalent to those of the present working example without providing the bonding layers 6, 7, for example, a resin content ratio of 60% or higher would be required in the unidirectional fiber bodies, and adequate weight-reducing effects would be impossible to obtain.

Accordingly, the present working example is an inner wall material that is suitable for the interior of an aircraft, has a low weight per unit area of 1.79 kg/m² or less, and can be endowed with a maximum bending load of 630 N or greater, a peel strength of 80 N·in/3 in or greater, and an in-plane shear strength of 33 kN or greater.

A non-woven cloth that includes glass fibers, i.e., glass paper, glass cloth, or the like may be employed as the surface material 3. When a fiber body that has electrical insulating properties is used as the surface material 3, the sandwich panel has excellent corrosion resistance and is free of electrical corrosion even when the sandwich panel comes in contact with aluminum material in the aircraft assembly process.

The abovementioned woven fiber bodies 6, 7 are used as the bonding layers 6, 7 in order to enhance the in-plane shear strength in the present working example, but an adhesive film that does not have a fiber body may also be used.

The present working example has the above-mentioned configuration in which the unidirectional fiber bodies 4, 5 are satisfactorily bonded to each other, and the honeycomb core 1 is satisfactorily bonded to the inside unidirectional fiber body 5 by the bonding layers 6, 7 that have a resin content ratio of 50% or higher. Therefore, adhesion between the layers can be enhanced, and the flexural strength of the sandwich panel and the peel strength between the honeycomb core and the upper and lower middle layers can be enhanced while maintaining light weight even when the resin content ratio of the unidirectional fiber body 4 is reduced to 30% or less, for example.

In particular, since a bonding layer 6 having a resin content ratio of 50% or higher is provided between the unidirectional fiber bodies 4, 5, and a bonding layer 7 having a resin content ratio of 70% or higher is provided between the honeycomb core 1 and the inside unidirectional fiber body 5, light weight can be obtained while maintaining satisfactory adhesion between the unidirectional fiber body 5 and the honeycomb core 1, which are composed of different types of material.

Furthermore, since the bonding layers 6, 7 are formed using woven fiber bodies 6, 7 in which the warp and woof yarns are each tilted approximately 45° in relation to the edge of the sandwich panel, pseudo-isotropy can be created by the unidirectional fiber body 4 that is parallel to the edge of the sandwich panel, the unidirectional fiber body 5 that is orthogonal to the edge, and the woven fiber bodies 6, 7 whose warp and woof yarns are tilted ±45° in relation to the edge, and the in-plane shear strength can be enhanced.

Accordingly, the present working example provides a sandwich panel that has excellent practicality as an inner wall material used in aircraft, for example, whereby the abovementioned flexural strength, peel strength, and in-plane shear strength can be obtained while having reduced weight.

The effect of the present working example will be described using supporting experimental examples.

The weight, peel strength, flexural strength, in-plane shear strength, flame-retardant properties, and smoke density were measured by a conventional example in which a pair of unidirectional fiber bodies at 0° and 90° having a phenol resin content ratio of approximately 30% were placed one layer at a time directly on the upper and lower surfaces of a honeycomb core without the use of the abovementioned bonding layers 6, 7; Working Example 1 in which adhesive films (resin content ratio of 100%) were used as the abovementioned bonding layers 6, 7; and Working Example 2 in which the abovementioned woven fiber bodies 6, 7 were used as the abovementioned bonding layers 6, 7. The results of the measurements are shown in FIG. 3.

Figure 4:
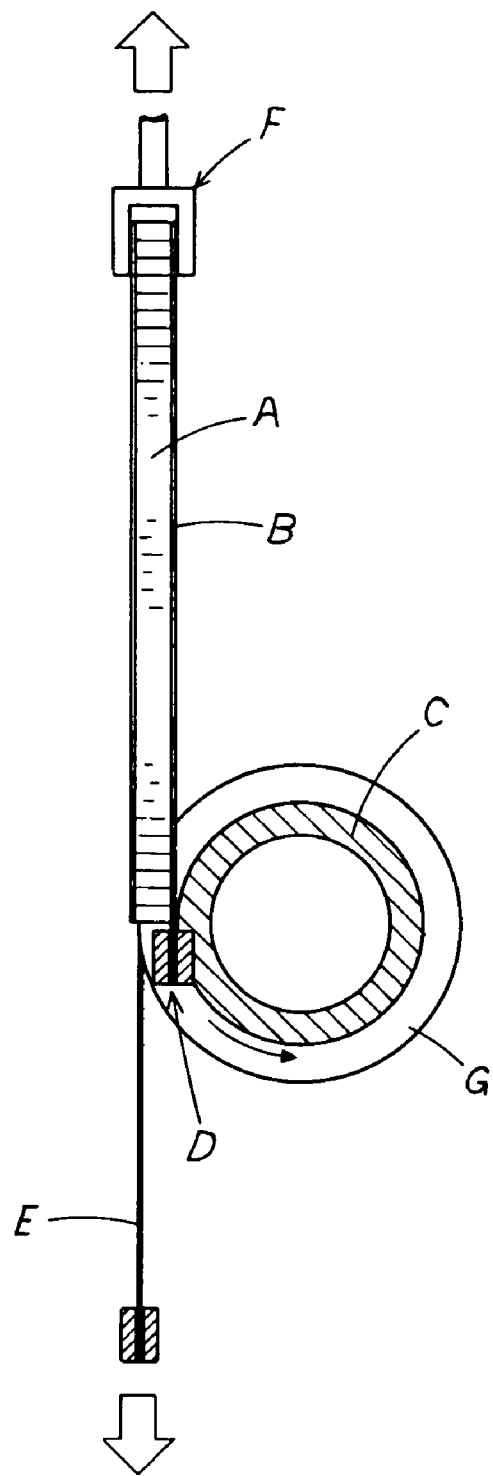
FIG. 4 is a schematic diagram showing the experimental apparatus.

The peel strength was measured using a commonly used drum peel testing apparatus of the type shown in FIG. 4. The reference symbol A in the diagram indicates the honeycomb core, B indicates the middle layer, C indicates the drum, D indicates a lower clamp, E indicates a loading strap, F indicates an upper clamp, and G indicates a flange.

Figure 5:
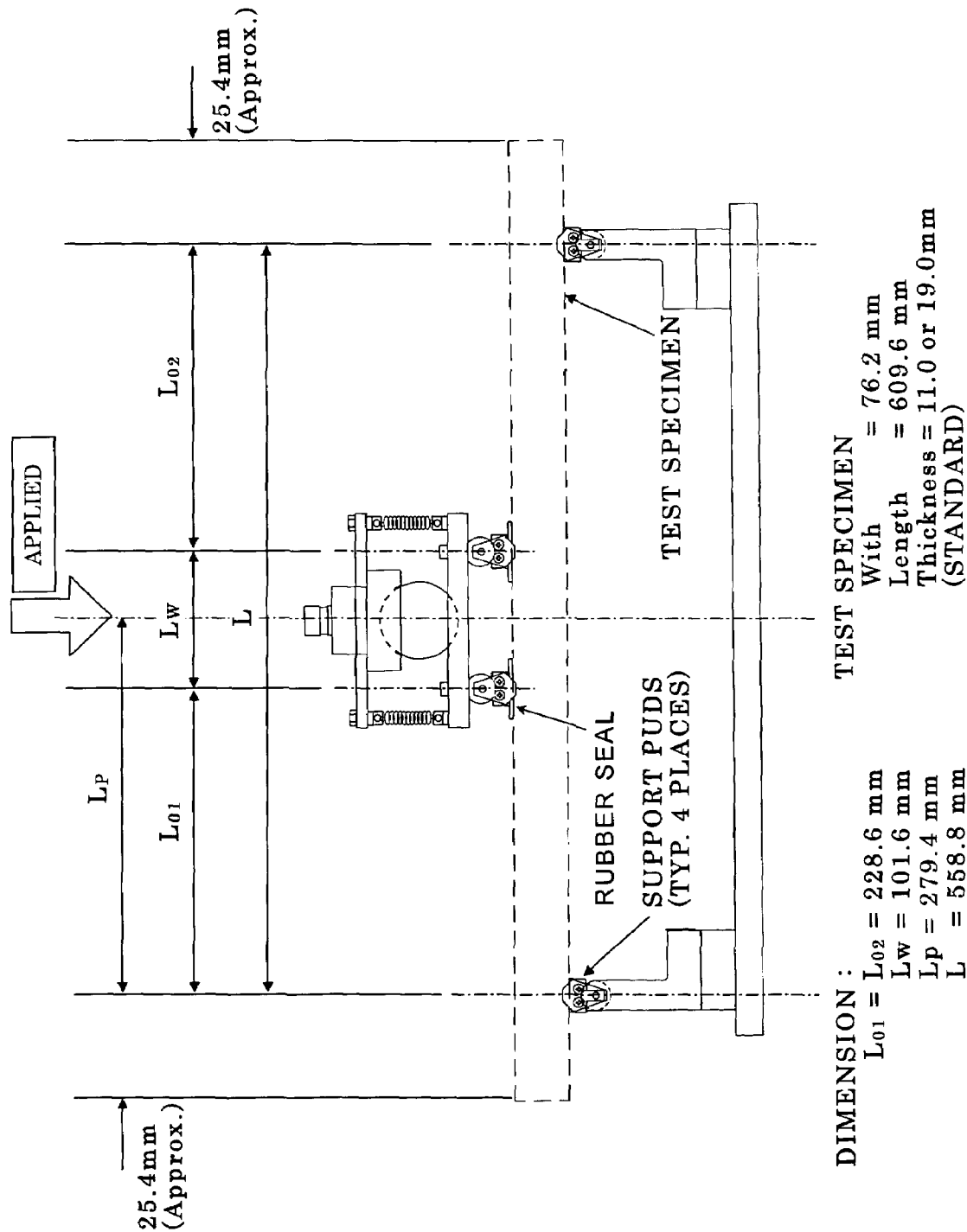
FIG. 5 is a schematic diagram showing the experimental apparatus.

The flexural strength (bending load) was measured at normal temperature (23±2° C.) and normal humidity (50±5% RH) using the type of device shown in FIG. 5 in accordance with bend test specification MIL-STD401B, and the speed was set to a speed whereby the sample broke in 3 to 5 minutes.

Figure 6:
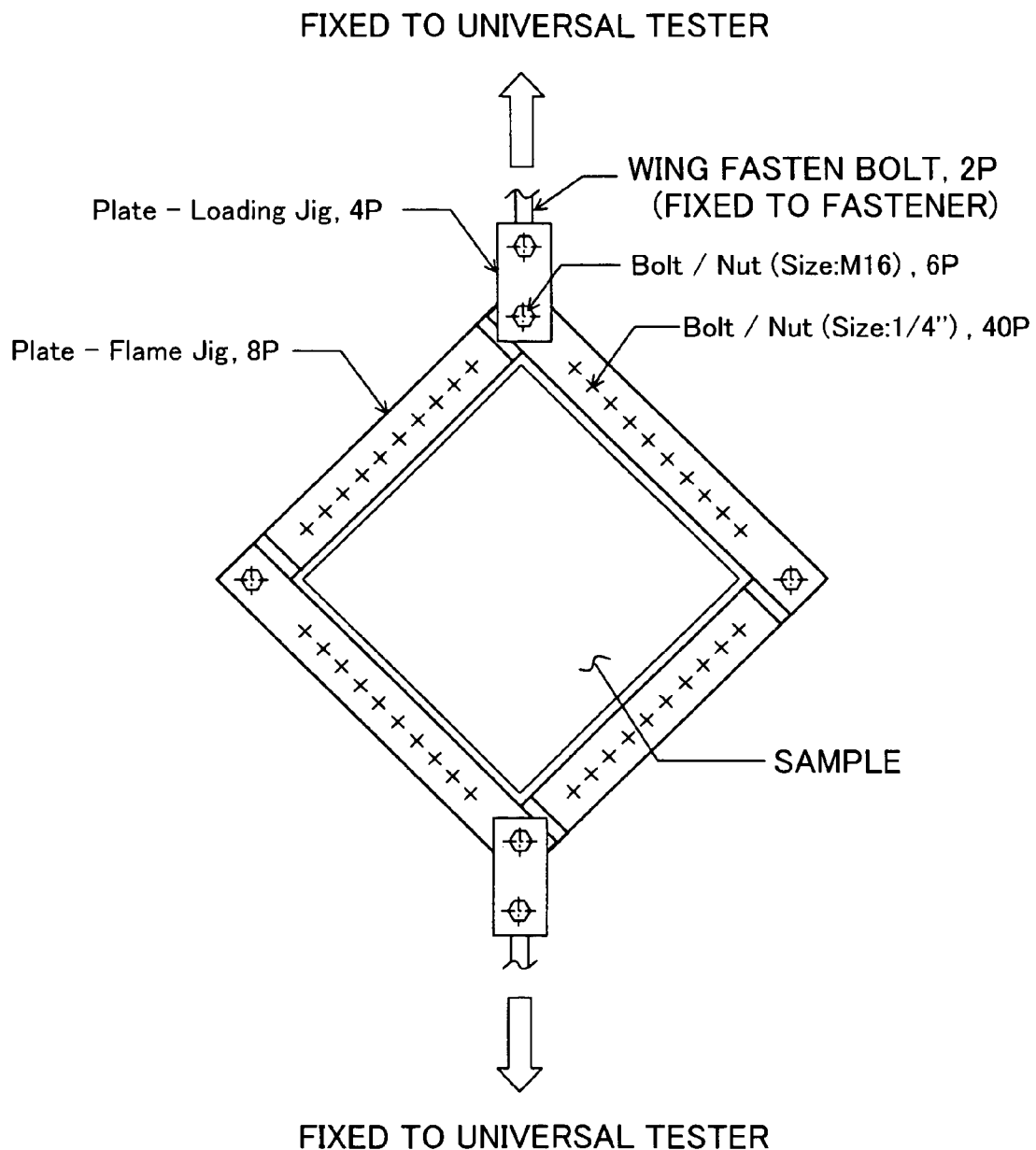
FIG. 6 is a schematic diagram showing the experimental apparatus.

The in-plane shear strength (IPS) was measured using the type of device shown in FIG. 6 according to an in-plane shear test (BMS4-17) used by Boeing Company (the measurement device was a Shimadzu Autograph AG-10).

It is apparent from the test results that although the conventional example that did not have the bonding layers 6, 7 was accordingly lightweight, the conventional example was markedly inferior to Working Examples 1 and 2 with respect to PEEL strength, bending load, IPS, and flame retardant properties.

Specifically, it was confirmed that peel strength, flexural strength, in-plane shear strength, and flame retardant properties are significantly enhanced with minimal increase in weight by providing bonding layers 6, 7 to improve adhesion between the unidirectional fiber bodies 4, 5 and adhesion between the honeycomb core 1 and the inside unidirectional fiber body 5. The smoke density was also confirmed to be significantly lower than 200, which is the common standard in materials used for aircraft interiors.

Adhesion can be improved in the conventional example by increasing the resin content ratio of the unidirectional fiber bodies, but a significant increase in weight is inevitable, as mentioned above.

Furthermore, it was confirmed by comparison of Working Examples 1 and 2 that the use of woven fiber bodies 6, 7 having fibers arranged at ±45° as the bonding layers 6, 7 enables further enhancement of strength (the in-plane shear strength in particular can be enhanced by a factor of about 1.6).

The abovementioned results confirmed that providing bonding layers having a high resin content ratio between the unidirectional fiber bodies and between the honeycomb core and the unidirectional fiber bodies, and providing woven fiber bodies in the bonding layers yields a lightweight sandwich panel that satisfies the requirements of flexural strength, peel strength, and in-plane shear strength for an inner wall material used in aircraft.

What is claimed is:

1. A sandwich panel comprising:
   a hollow columnar core;
   a middle material layered on a first surface of the hollow columnar core and layered on a second surface of the hollow columnar core; and
   a surface material layered on the middle material layered on the first surface of the hollow columnar core and layered on the middle material layered on the second surface of the hollow columnar core,
   wherein said middle material comprises:
      a first unidirectional fiber body, said first unidirectional fiber body having fibers that are aligned in a direction that is substantially parallel to an edge of the sandwich panel;
      a second unidirectional fiber body, said second unidirectional fiber body having fibers that are aligned in a direction that is substantially orthogonal to an edge of the sandwich panel;
      a first bonding layer having a resin content ratio of 50% or higher provided between the first unidirectional fiber body and the second unidirectional fiber body; and
      a second bonding layer having a resin content ratio of 50% or higher provided between said first and second surfaces of said hollow columnar core and the second unidirectional fiber body, and
   wherein:
      said first and second bonding layers comprise woven fiber bodies in which fibers are used for a warp yarn and a woof yarn, and the yarns are woven,
      the woven fiber bodies are formed so that the warp yarn and the woof yarn are each tilted approximately 45° in relation to said edge of said sandwich panel,
      a polyvinylidene fluoride film or a non-woven cloth that includes glass fibers is employed as said surface material, and
      the sandwich panel has a weight per unit area of 1.79 kg/m² or less, a maximum bending load of 520 N or greater, a peel strength of 80 N·in/3 in or greater, and an in-plane shear strength of 20 kN or greater, and
      the resin content ratio is a ratio between a weight of resin in a bonding layer and a weight of the bonding layer containing the resin.

2. The sandwich panel according to claim 1, wherein carbon fibers are used for the fibers of said first and second unidirectional fiber bodies, and glass fibers are used for the fibers of said woven fiber bodies.

3. The sandwich panel according to claim 1, wherein carbon fibers are used for the fibers of said first and second unidirectional fiber bodies, and glass fibers and carbon fibers are used for the fibers of said woven fiber bodies.

4. The sandwich panel according to claim 1, wherein the resin content ratio of the first bonding layer is 50% to 65%, and
   wherein the resin content ratio of the second bonding layer is 50% to 85%.

5. A sandwich panel comprising:
   a hollow columnar core;
   a middle material layered on a first surface of the hollow columnar core and layered on a second surface of the hollow columnar core; and
   a surface material layered on the middle material layered on the first surface of the hollow columnar core and layered on the middle material layered on the second surface of the hollow columnar core,
   wherein said middle material comprises:
      a first unidirectional fiber body having a resin content ratio of 30% or lower, said first unidirectional fiber body having fibers that are aligned in a direction that is substantially parallel to an edge of the sandwich panel;
      a second unidirectional fiber body having a resin content ratio of 30% or lower, said second unidirectional fiber body having fibers that are aligned in a direction that is substantially orthogonal to an edge of the sandwich panel;
      a first bonding layer having a resin content ratio of 50% or higher provided between the first unidirectional fiber body and the second unidirectional fiber body; and
      a second bonding layer having a resin content ratio of 70% or higher provided between the first and second surfaces of the hollow columnar core and the second unidirectional fiber body, and
   wherein:
      said first and second bonding layers comprise woven fiber bodies in which fibers are used for a warp yarn and a woof yarn, and the yarns are woven,
      the woven fiber bodies are formed so that the warp yarn and the woof yarn are each tilted approximately 45° in relation to said edge of said sandwich panel,
      a polyvinylidene fluoride film or a non-woven cloth that includes glass fibers is employed as said surface material, and
      the sandwich panel has a weight per unit area of 1.79 kg/m² or less, a maximum bending load of 520 N or greater, a peel strength of 80 N·in/3 in or greater, and an in-plane shear strength of 20 kN or greater, and the resin content ratio is a ratio between a weight of resin in a bonding layer or a fiber body and a weight of the bonding layer or the fiber body containing the resin.

6. The sandwich panel according to claim 5, wherein carbon fibers are used for the fibers of said first and second unidirectional fiber bodies, and glass fibers are used for the fibers of said woven fiber bodies.

7. The sandwich panel according to claim 5, wherein carbon fibers are used for the fibers of said first and second unidirectional fiber bodies, and glass fibers and carbon fibers are used for the fibers of said woven fiber bodies.

8. The sandwich panel according to claim 5, wherein the resin content ratio of the first bonding layer is 50% to 65%, and
wherein the resin content ratio of the second bonding layer is 70% to 85%.

9. A sandwich panel comprising:
a hollow columnar core;
a middle material layered on a first surface of the hollow columnar core and layered on a second surface of the hollow columnar core; and
a surface material layered on the middle material layered on the first surface of the hollow columnar core and layered on the middle material layered on the second surface of the hollow columnar core,
wherein said middle material comprises:
 a first unidirectional fiber body, said first unidirectional fiber body having fibers that are aligned in a direction that is substantially parallel to an edge of the sandwich panel;
 a second unidirectional fiber body, said second unidirectional fiber body having fibers that are aligned in a direction that is substantially orthogonal to an edge of the sandwich panel;
 a first bonding layer having a resin content ratio of 50% or higher provided between the first unidirectional fiber body and the second unidirectional fiber body; and
 a second bonding layer having a resin content ratio of 50% or higher is provided between said first and second surfaces of said hollow columnar core and the second unidirectional fiber body, and
wherein:
 said first and second bonding layers comprise woven fiber bodies in which fibers are used for a warp yarn and a woof yarn, and the yarns are woven,
 the woven fiber bodies are formed so that the warp yarn and the woof yarn are each tilted approximately 45° in relation to said edge of said sandwich panel,
 wherein a polyvinylidene fluoride film or a non-woven cloth that includes glass fibers is employed as said surface material, and
 wherein the sandwich panel has a weight per unit area of 1.79 kg/m² or less, a maximum bending load of 520 N or greater, a peel strength of 80 N·n/3 in or greater, and an in-plane shear strength of 20 kN or greater
 wherein said resin comprises a resol-based phenol resin, said resol-based phenol resin having a five-minute peak heat release rate (HRR) of 30 kW/m² or less in a heat release test, a two-minute heat release integral of 30 kW min/m² or less, and a smoke density of 200 or less during combustion, and
 the resin content ratio is a ratio between a weight of resin in a bonding layer and a weight of the bonding layer containing the resin.

10. A sandwich panel comprising:
a hollow columnar core;
a middle material layered on a first surface of the hollow columnar core and layered on a second surface of the hollow columnar core; and
a surface material layered on the middle material layered on the first surface of the hollow columnar core and layered on the middle material layered on the second surface of the hollow columnar core,
wherein said middle material comprises:
 a first unidirectional fiber body having a resin content ratio of 30% or lower, said first unidirectional fiber body having fibers that are aligned in a direction that is substantially parallel to an edge of the sandwich panel;
 a second unidirectional fiber body having a resin content ratio of 30% or lower, said second unidirectional fiber body having fibers that are aligned in a direction that is substantially orthogonal to an edge of the sandwich panel;
 a first bonding layer having a resin content ratio of 50% or higher provided between the first unidirectional fiber body and the second unidirectional fiber body; and
 a second bonding layer having a resin content ratio of 70% or higher provided between the first and second surfaces of the hollow columnar core and the second unidirectional fiber body, and
wherein:
 said first and second bonding layers comprise woven fiber bodies in which fibers are used for a warp yarn and a woof yarn, and the yarns are woven,
 the woven fiber bodies are formed so that the warp yarn and the woof yarn are each tilted approximately 45° in relation to said edge of said sandwich panel,
 a polyvinylidene fluoride film or a non-woven cloth that includes glass fibers is employed as said surface material, and
 the sandwich panel has a weight per unit area of 1.79 kg/m² or less, a maximum bending load of 520 N or greater, a peel strength of 80 N·in/3 in or greater, and an in-plane shear strength of 20 kN or greater,
 wherein the resin comprises a specific resol-based phenol resin having a five-minute peak heat release rate (HRR) of 30 kW/m² or less in a heat release test, a two-minute heat release integral of 30 kW min/m² or less, and a smoke density of 200 or less during combustion, and
 the resin content ratio is a ratio between a weight of resin in a bonding layer or a fiber body and a weight of the bonding layer or the fiber body containing the resin.

* * * * *